United States Patent Office 3,278,874
Patented Oct. 11, 1966

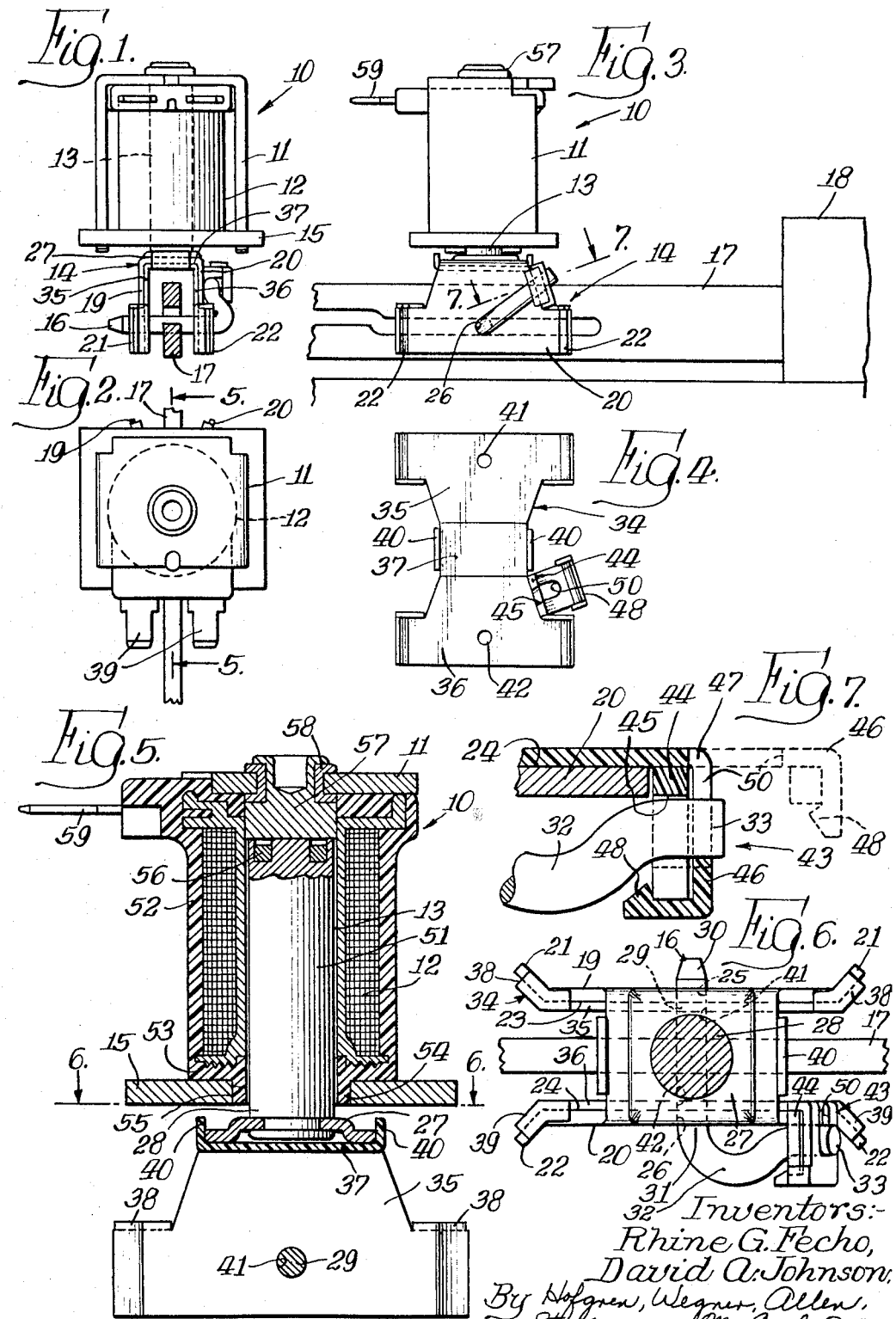

3,278,874
SOLENOID STRUCTURE WITH IMPROVED GUIDE MEANS
Rhine G. Fecho, Baroda, and David A. Johnson, St. Joseph, Mich., assignors to Whirlpool Corporation, a corporation of Delaware
Filed Dec. 31, 1963, Ser. No. 334,826
8 Claims. (Cl. 335—262)

This invention relates to solenoid structures and in particular to electromagnetic solenoid structures.

In one conventional application of electromagnetic solenoids, the solenoid is provided with a connector portion connected to the device to be operated such as by a cam bar. In certain applications, such as washing machines, the known solenoids present a problem in that frictional resistance between the connector portion of the solenoid and the cam bar may at times cause malfunctioning of the apparatus. Further, the noise produced by the actuation of the solenoid against the metal cam bar may be objectionable, such as where the washing machine is installed in a home kitchen. Still further, the magnetic circuit resulting from the connection of the metal cam bar to the metal connector portion of the plunger results in an undesirable residual magnetic effect adversely affecting the operation of the apparatus. Additionally, in the known solenoid structures, the connecting means is retained in association with the solenoid plunger in such a manner as to make it difficult to remove, such as for servicing the apparatus. Still further, in certain of the known solenoid structures, the plunger is slidably guided in a metal bearing element carried by the enclosure of the electromagnetic coil of the solenoid. This structure is relatively expensive. The present invention comprehends an improved solenoid structure eliminating the disadvantages of the known solenoid structures discussed above. Thus, a principal feature of the present invention is the provision of a new and improved solenoid structure.

Another feature of the invention is the provision of such a solenoid structure having new and improved means for connecting to the plunger of the solenoid the apparatus to be operated by the solenoid.

A further feature of the invention is the provision of such a solenoid structure including a solenoid plunger having a guide at one end, a liner carried on the guide and defining a slide surface, and connector means carried by the guide, the connector means having a connecting portion, the liner further having locking means for releasably retaining the connector means in association with the guide.

Still another feature of the invention is the provision of such a solenoid structure including a solenoid plunger having at one end a bifurcated cam bar guide including spaced legs having inner confronting surfaces and provided with opposed openings, a liner formed of a plastic material carried on the guide and defining a pair of confronting slide surfaces overlying the leg inner surfaces, and pin means having a connector portion extending across the space between the legs and opposite end portions extending through the openings, the pin means and the liner further including cooperating lock means for releasably retaining the pin means with the end portions in the openings.

A still further feature of the invention is the provision of such a solenoid structure including new and improved means for guiding the plunger axially of the electromagnetic coil during operation of the solenoid.

A yet further feature of the invention is the provision of such a solenoid structure including a solenoid plunger having a guide at one end and a cylindrical armature portion at the other end, an electromagnetic coil encircling the other end of the plunger, and an encapsulating enclosure surrounding the coil and including a tubular end portion defining a sleeve bearing axially slidably carrying the plunger.

Other features and advantages of the invention will be apparent from the following description taken in connection with the accompanying drawing wherein:

FIGURE 1 is a front elevation of a solenoid structure embodying the invention connected to a cam bar of an apparatus operated by the solenoid structure;

FIGURE 2 is a top plan view thereof;

FIGURE 3 is a side elevation thereof;

FIGURE 4 is a plan view of the blanked liner prior to the assembly thereof in the guide of the solenoid structure;

FIGURE 5 is an enlarged diametric section of the solenoid structure taken substantially along the line 5—5 of FIGURE 2;

FIGURE 6 is a horizontal section taken substantially along the line 6—6 of FIGURE 5; and FIGURE 7 is a fragmentary enlarged section taken substantially along the line 7—7 of FIGURE 3, and illustrating the selective arrangements of the locking means.

In the exemplary embodiment of the invention as disclosed in the drawing, a solenoid structure generally designated 10 is shown to comprise a permeable frame 11 within which is fitted an encapsulated electromagnetic coil 12. A plunger 13 extends axially within the coil and includes an outer guide portion 14 disposed externally of the coil and below a support plate 15 which may comprise the lower portion of the frame 11. The guide 14 carries a connector 16 which engages a cam bar 17 of a device 18 to be operated by the solenoid, as shown in FIGURE 3. The cam bar 17 and apparatus 18 are illustrative only, it being understood that the solenoid is adapted for operating any suitable apparatus by suitable interconnecting structure as a result of the reciprocal movement of the connector 16 of the solenoid.

As shown in FIGURE 1, the guide 14 includes a pair of spaced legs 19 and 20. The legs may be provided with outturned distal ends 21 and 22 respectively, as best seen in FIGURE 6. The legs 19 and 20 further define opposed inwardly facing surfaces 23 and 24, respectively. The leg 19 is provided with an opening 25 in the mid-portion thereof, and the leg 20 is provided with a corresponding opening 26 in the mid-portion thereof in axial alignment with the opening 25. As shown in FIGURE 1, the guide 14 further includes a bight 27 to which the lower end 28 of the plunger 13 is connected.

The connector 16 herein comprises a pin having a rectilinear portion 29 extending across the space between the legs 19 and 20 and having a first end portion 30 projecting through the opening 25, as shown in FIGURE 6. The opposite end portion 31 of the pin 16 projects through the opposite opening 26 in leg 20 and is provided with a turned distal extension 32 having a tab portion 33 adjacent one turned end 22 of the leg 20.

The guide 14 further carries a liner generally designated 34 which extends generally coextensively with the inner surfaces of the guide 14. More specifically, the liner 34 includes a first leg portion 35 overlying the inner surface 23 of the leg 19 and a second leg portion 36 overlying the inner surface 24 of the leg 20. The legs of the liner are joined by a bight portion 37, as illustrated in FIGURE 5. To assist in retaining the liner on the inner surfaces of the guide 14, the liner is provided with a pair of flanges 38 overlying the turned ends 21 of the guide leg 19, a pair of flanges 39 overlying the turned ends 22 of the guide leg 20, and a pair of flanges 40 upturned from the bight portion 37 to engage the opposite ends of the guide bight portion 27. The liner is further provided with a first opening 41 in the leg 35 and a second opening 42 in the leg 36 axially aligned with the openings 25 and 26 of the guide legs 19 and 20, respectively. Thus, the pin portion 29 extends successively through the openings 26, 42, 41 and 25 in traversing the assembled guide 14 and liner 34.

The pin 16 is retained in the guide traversing position by a lock 43 on the liner 34 comprising a U-shaped flange 44 extending perpendicularly from the liner leg 36 intermediate the upright flange 40 and the end flange 39 thereof at the end of the guide toward which the pin end 32 is turned. Thus, as best seen in FIGURES 6 and 7, the tab 33 of the pin end 32 is selectively receivable in the slot 45 of the flange 44 when the rectilinear portion 29 is disposed in the guide traversing position. The liner is further provided with a latching flange 46 having a flexible joint 47 connecting it to the body of the liner permitting selective disposition of the latching flange in an outer position, as shown in dotted lines in FIGURE 7, and in an inner latching position, as shown in full lines in FIGURE 7, wherein a distal catch 48 on the latching flange 46 hooks behind the U-shaped flange 44. The latching flange 46 is further provided with a slot 50 through which the distal tab 33 of the pin end 32 extends in the latched arrangement, as shown in FIGURES 6 and 7, whereby the pin tab portion 33 is positively retained against movement away from the leg 20. Thus, the locking means 43 serves to retain in the pin 16 in association with the guide 14; and the pin 16, thusly retained by the locking means, serves to retain the liner 34 in association with the guide both by its association with the locking means 43 and the projecting of the pin portion 29 through the openings 26, 42, 41 and 25, respectively.

The liner 34 is preferably formed of a material having a low coefficient of friction whereby undesirable frictional forces of engagement with the cam bar 17 are effectively minimized. Further, the liner 34 is preferably formed of a material adapted to produce effectively minimum sound when engaged by a metallic element such as the cam bar 17, thereby eliminating the undesirable noise occurring during operation of conventional solenoids wherein metal-to-metal surface engagements may occur.

Further, the liner 34 is preferably formed of a material having a low magnetic permeability whereby residual magnetic effects between the guide 14 and the cam bar 17 are effectively eliminated. Illustratively, the liner may be formed of a suitable plastic having the desired characteristics discussed above. One excellent example of such a plastic material is polypropylene.

Referring how more specifically to FIGURE 5, the upper armature portion 51 of the solenoid plunger 13 is axially slidably retained within the annular coil 12 for vertical reciprocation as a function of the electrical energization of the coil. The coil 12 herein is encapsulated in an enclosure 52 formed of a plastic material such as nylon. The present invention comprehends the provision of the enclosure 52 with a bottom portion 53 having a depending tubular portion 54 defining a sleeve bearing for guiding the plunger armature 51 slidably during its movement relative to the coil. The bottom plate 15 of the frame 11 is provided with an opening 55 in which the tubular portion 54 of the enclosure 52 is fitted to support the encapsulated coil structure on the bottom plate in the position illustrated in FIGURE 5. Thus, the encapsulated coil may be formed at relatively low cost and provides improved magnetic characteristics, as the metal elements at the lower end of the coil which are conventional in known solenoid structures of this type are effectively eliminated.

The upper end of the armature 51 may be provided with a conventional shading coil 56. A conventional pole piece 57 may be carried on the frame 11 in a suitable brass insulator 58 in the conventional manner. The solenoid coil 12 may be provided with conventional terminals 59 for connecting the coil to a suitable source of electrical power as desired.

Thus, solenoid 10 provides an improved simplified and economical structure eliminating a number of disadvantages found in the solenoid structures of the art and providing improved trouble-free life. The solenoid structure 10 further permits facilitated maintenance as connecting and disconnecting of the plunger guide 14 to the cam bar 17 may be readily effected.

While we have shown and described one embodiment of our invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Solenoid structure comprising: a solenoid plunger having a guide at one end; a liner carried on said guide and defining a slide surface overlying said guide and defining a connecting space; and connector means carried by the guide, said connector means having a connecting portion extending through said connecting space, said liner further having lock means for releasably retaining said connector means in association with said guide with said connecting portion retaining said liner in association with said guide.

2. The solenoid structure of claim 1 wherein said liner is formed of a material having a low coefficient of friction.

3. The solenoid structure of claim 1 wherein said liner is formed of a material adapted to produce effectively minimum sound when frictionally engaged by a metal element.

4. The solenoid structure of claim 1 wherein said liner is formed of a material having low magnetic permeability.

5. Solenoid structure comprising: a solenoid plunger having a guide at one end; a liner carried on said guide and defining a slide surface; and connector means carried by the guide, said liner further having lock means for releasably retaining said connector means in association with said guide, and said connector means having means cooperating with said liner to retain and liner in said guide when the connector means is so carried by said guide.

6. Solenoid structure comprising: a solenoid plunger having at one end a bifurcated cam bar guide including spaced legs having inner confronting surfaces and provided with opposed openings; a liner carried on said guide and defining a pair of confronting slide surfaces overlying said leg inner surfaces; and connector means extending across the space between said legs, and having spaced portions received in said openings, said liner further having lock means for releasably retaining said connector means with said spaced portions in said openings.

7. The solenoid structure of claim 6 wherein said connector means comprises a pin having a rectilinear portion and an outer turned end engageable with said lock means for retaining the rectilinear portion extending across said space and through said openings.

8. Solenoid structure comprising: a solenoid plunger having at one end a bifurcated cam bar guide including spaced legs having inner confronting surfaces and provided with opposed openings; a liner formed of a plastic material carried on said guide and defining a pair of confronting slide surfaces overlying said leg inner surfaces; and pin means having a connector portion extending across the space between said legs and opposite end portions extending through said openings, said pin means and said liner further including cooperating lock means for releasably retaining said pin means with said end portions in said openings.

References Cited by the Examiner
UNITED STATES PATENTS

| | | | |
|---|---|---|---|
| 2,449,438 | 9/1948 | Wisegarver | 317—191 |
| 2,734,153 | 2/1956 | Soreng et al. | 317—191 |
| 2,956,312 | 10/1960 | Naimer. | |
| 3,157,831 | 11/1964 | Ray | 317—191 X |

BERNARD A. GILHEANY, *Primary Examiner.*

G. HARRIS, JR., *Assistant Examiner.*